Inventor:
HANS GRETHER

Bailey, Stephens + Huettig
ATTORNEYS

United States Patent Office 3,398,642
Patented Aug. 27, 1968

3,398,642
DUPLICATING MACHINE TOOL
Hans Grether, Frankfurt am Main, Germany, assignor to Nassovia Werkzeugmaschinenfabrik G.m.b.H., Frankfurt am Main, Germany
Filed Mar. 21, 1966, Ser. No. 535,951
Claims priority, application Germany, Mar. 20, 1965, N 26,422
1 Claim. (Cl. 90—13.1)

ABSTRACT OF THE DISCLOSURE

A duplicating machine tool has a tracing unit and at least two milling units. An extension member fastened to the pattern sled and extending over the workpiece sled permits the cutting of the workpieces into two shapes identical with the pattern, or one identical and one mirror shape, or two mirror shapes.

---

This invention relates to a duplicating machine tool and especially to a duplicating milling machine.

The machine of this invention is composed of a tracer unit and two or more milling units for fabricating workpieces which are either identical with or a mirror image of a pattern. In such a machine, the movements of a sensor which traces the pattern either automatically or manually in three planes controls the corresponding movements of the milling unit.

Conventional machines of this type use two or more milling units, one of which being always rigidly connected to the tracing unit for selectively moving the units in the same direction for making workpieces identical to the pattern or in opposite directions for the making of mirror image workpieces. The respective workpiece tables or sleds are either stationary in the direction of pattern sled movement or, on the other hand, the milling units do not have any choice of movement in one or two of the three directions while the workpiece sleds, one of which is fastened to the pattern sled, execute the identical or opposite movements.

Thus it is possible with conventional duplicating milling machines to make, for example, with two milling units either two identical workpieces or one that is identical to the pattern while the other is a mirror image. However, in these conventional machines, it is not possible to duplicate at the same time two workpieces which are the mirror image of the pattern as, for example, from a right pattern to left workpieces.

The object of this invention is to produce a duplicating machine in which several milling elements are used so that the machine can produce from a pattern selectively at least two workpieces identical with the pattern, one workpiece that is identical and one that is the mirror image of the pattern, or at least two workpieces that are mirror images of the pattern.

The machine of this invention is a duplicating fraising machine having several milling spindles, a pattern sled movable in contact with the tracing unit and which are both movable with regard to each other in the same or opposite directions and further having means attached to the pattern sled so that at least the workpiece moving in the direction of the pattern sled moves within the operating range of the milling units. The means attached to the pattern sled is a table or extension member fastened to the pattern sled for supporting the pattern together with one or more workpieces. This includes machines having more than two milling units so that the workpieces are movable within the range of the multiple milling units. Thus this invention permits the making of at least two workpieces identical with the pattern, one identical and one mirror image workpiece, or two workpieces in mirror image of the pattern.

Figure 1:
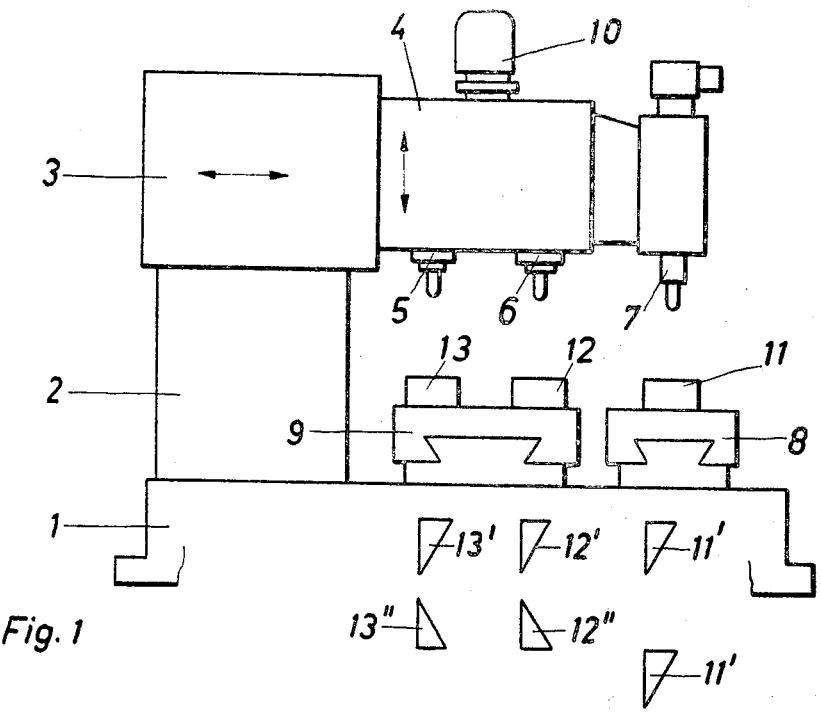
Figure 2:
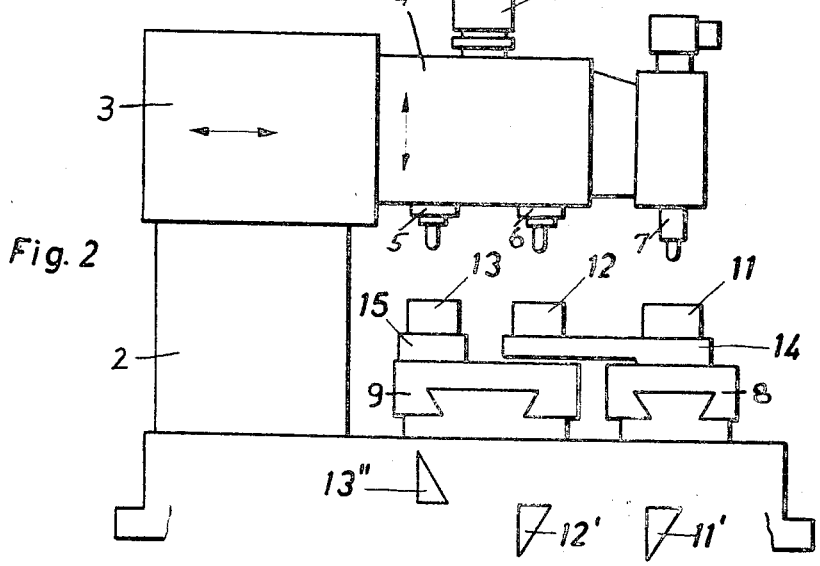

The means by which the objects of the invention are obtained are described more fully with respect to the accompanying drawings in which:

FIGURE 1 is a side view of a duplicating milling machine having two milling spindles for the production of workpieces either identical to the pattern or in mirror image thereof; and FIGURE 2 is a similar view of the machine adapted to produce one workpiece identical to and one workpiece in mirror image of the pattern.

As shown in FIGURE 1, the machine bed 1 supports the stand 2 carrying the cross head 3 and the vertical head 4, the latter carrying two milling units 5 and 6 and the tracer unit 7. Bed 1 also supports the pattern carrying sled 8 and the workpiece carrying sled 9.

Of all the possible advancing movements in the three coordinate planes, the longitudinal movements are executed by the sleds 8 and 9, the transverse movements by the cross head 3 and the vertical movements by the head 4. Milling spindles 5 and 6 are driven by electric motor 10. Sleds 8 and 9 can be driven each in the same direction or in opposite directions. These driven movements are conventional and not further described except to say that they are composed of adjustable spindle drives or rack and pinion drives operated by electric or hydraulic motors. The pattern 11 is carried by sled 8 and has, for example, a recess in the form of a triangle 11'.

The workpiece sled 9 below the milling units carries two workpieces 12 and 13. If the drive elements for the sleds are operated so the pattern and work sleds move in the same direction, then two identical workpieces 12' and 13' are made from the pattern 11. By reversing the direction of movement of one of the sleds, it is possible to produce from the pattern shape 11 two mirror images 12'' and 13''.

However, if one workpiece identical to the pattern and one workpiece in mirror image to the pattern are to be duplicated from the pattern 11 and while retaining the opposite directions of movement of the pattern sled 8 and the workpiece sled 9, according to this invention, an extension member 14 is placed on pattern sled 8 and a workpiece carrying block 15 put on workpiece sled 9. The latter is not absolutely necessary. Thus the extension member or table 14 is such that it extends over the workpiece sled 9 in the range of the milling unit 6. Member 14 thus carries the pattern 11 as well as the workpiece 12 while the block 15 only carries the workpiece 13. It is clear that the extension member 14 can extend into the range of a plurality of milling units so that two or more workpieces can be fabricated in mirror image with the pattern. Also, in accordance with this invention, duplicating milling machines with the same or opposite movements can be constructed with stationary pattern and workpiece sleds and movable milling units and tracing units. However, in such case, in accordance with the principles of this invention, it is necessary to separate the milling unit head from the tracer unit head and to construct the machine elements in such manner that the head carrying the milling units can be coupled with the tracer head unit and to provide both heads with separate driving means which permit the heads to be moved either in the same or in opposite directions.

Having now described the means by which the objects of the invention are obtained, I claim:

1. A duplicating machine tool, including a duplicating milling machine, comprising a tracing unit, at least two milling units for producing workpieces either identical to or in mirror image of a pattern, movable pattern carrying sled means for moving a pattern in contact with said tracing unit, workpiece sled means for moving workpieces in contact with said milling units either in the same or the opposite direction of the movement of said movable pattern carrying sled means, an extension member mounted on said pattern carrying sled means for holding a pattern and extended over said workpiece sled means for carrying a workpiece movable with said pattern carrying sled means and in contact with a milling unit.

References Cited

UNITED STATES PATENTS

| | | | |
|---|---|---|---|
| 2,247,462 | 7/1941 | Zwick | 90—13.1 |
| 2,303,956 | 12/1942 | Rossbacher | 90—13.1 |
| 3,249,016 | 5/1966 | Renegar | 90—13.1 |

GERALD A. DOST, *Primary Examiner.*